United States Patent [19]

Bunch

[11] Patent Number: 5,618,574
[45] Date of Patent: Apr. 8, 1997

[54] FISH FOOD

[75] Inventor: Gene W. Bunch, Aloha, Oreg.

[73] Assignee: Clearwater Fish & Pond Supply, Inc., Aloha, Oreg.

[21] Appl. No.: 440,231

[22] Filed: May 12, 1995

[51] Int. Cl.$^6$ .................. A23L 1/31; A23K 1/18
[52] U.S. Cl. ............... 426/641; 426/2; 426/805
[58] Field of Search ................. 426/641, 2, 805

[56] References Cited

U.S. PATENT DOCUMENTS

| | | | |
|---|---|---|---|
| 2,825,648 | 3/1958 | Corbett | 426/643 |
| 3,719,496 | 3/1973 | Chen et al. | 426/385 |
| 3,889,007 | 6/1975 | Gunter et al. | |
| 4,537,785 | 8/1985 | Nichols | |
| 4,868,001 | 9/1989 | Maruta | |
| 4,871,551 | 10/1989 | Spencer | |
| 5,216,029 | 6/1993 | Anderson et al. | |

OTHER PUBLICATIONS

Bondari et al., "Soldier Fly Larvae as Feed in Commercial Fish Production," *Aquaculture*, 24:103–109 (1981).

Heidinger, "Use of Ultraviolet Light to Increase the Availability of Aerial Insects to Caged Bluegill Sunfish," *The Progressive Fish–Culturist*, 33:187–192 (1971).

Hale, "Dried *Hermetia illucens* Larvae (Diptera: Stratiomyidae) As A Feed Additive for Poultry," *J. Georgia Entomol. Soc.*, 8:16–20 (1973).

Bondari et al., "Soldier Fly, *Hermetia illucens* L., Larvae as Feed for Channel Catfish, *Ictalurus punctatus* (Rafinesque), and Blue Tilapia, *Oreochromis aureus* (Steindachner)", *Aguaculture and Fisheries Management*, 18:209–220 (1987).

Newton et al., "Dried *Hermetia illucens* Larvae Meal as a Supplement for Swine," *J. Animal Science*, 44:395–400 (1977).

Newton et al., "The Soldier Fly is a Beneficial Insect: House Fly Control, Manure Volume Reduction, and Manure Nutrient Recycling," Presented at Nuisance Concerns in Animal Manure Management: Odors and Flies Symposium, Gainesville, FL, 14 pp., Mar. 21–22, 1995.

Tacon, "Standard Methods for the Nutrition and Feeding of Farmed Fish and Shrimp," Vol. 2: Nutrient Sources and Composition, pp. 84–89 (1990).

Loyacano, "Pupae of Face Fly as Food for Channel Catfish" (abstract), *Proc. Annu. Conf. Southeast Assoc. Game Fish Comm.*, 28:228–231 (1974).

Finke et al., "Use of a Four-Parameter Logistic Model to Evaluate the Quality of the Protein from Three Insect Species When Fed to Rats," *Amer. Inst. Nutrition*, pp. 864–871 (1989).

Habib et al., "Evaluation of Silkworm Pupae Meal as a Dietary Protein Source for *Clarias batrachus* Fingerlings" (abstract), *Aquaculture*, 124:62 (1994).

Waddington, *Koi Kichi*, Peter Waddington, Ltd. Trading as Infiltration Unit 13, Millingford Industrial Estate, Golborne, Warrington, Cheshire WA3 3QE, United Kingdom, 1995, pp. 188–189.

*Primary Examiner*—Esther Kepplinger
*Assistant Examiner*—Choon P. Koh
*Attorney, Agent, or Firm*—Klarquist Sparkman Campbell Leigh & Whinston

[57] ABSTRACT

Fish foods and food supplements are provided that comprise an amount of preserved immature insects, e.g., dried housefly or soldier fly larvae or pupae, effective to improve the growth, feeding efficiency, or coloration of fish, including, but not limited to, koi, trout, bass, catfish, and tropical aquarium fish. Also provided are related methods of improving the growth, feeding efficiency, or coloration of fish.

8 Claims, No Drawings

FISH FOOD

TECHNICAL FIELD

This invention pertains to the field of foods or food supplements for cultivated fish.

BACKGROUND ART

In cultivating fresh water and salt water fish it is generally necessary to provide artificial food sources to supplement whatever natural food sources may be present. A variety of foods are fed to cultivated fish in both natural and controlled environments, e.g., in aquariums or special tanks or ponds.

For example, naturally occurring water animals such as *Daphnia pulex, Artemia salinas* (brine shrimp), mosquito larvae, Tubifex worms, and Cyclops have been used as fish foods. Natural foods are often best for optimum fish growth and condition. However, these natural foods are laborious and costly to produce and are usually restricted by inconsistent availability and erratic quality, may have a short lifetime, and are difficult to keep. In addition, the availability of such natural foods is largely seasonal.

For these reasons, many types of processed or prepared fish foods have been introduced commercially. These commercial fish foods include baked and ground cake type foods, flaked foods, and frozen or air dried foods. Such commercial fish foods suffer from a number of disadvantages. Processed or prepared foods are less expensive but may not provide for optimal growth and may not bring fish to a breeding condition. Moreover, the coloration of cultivated fish fed such processed or prepared foods may be drab. This is especially a problem in the case of fish that are prized for their attractive coloration, such as koi.

Insects have been used in the past to feed fish. Silkworm pupae have been used as a component of the diet of carp in Japan and China (Hickling, Fish Culture, Faber and Faber: London, 1962). Light traps have been used to attract aerial insects to supplement the diet of bluegill (Heidinger, Prog. Fish-Cult., 33:187–192, 1971). Pupae of face fly (*Musca autumnalis*) have been fed to channel catfish (Loyacano Jr., Proc. Annu. Conf. Southeast Assoc. Game Fish Comm., 28:228–231, 1974). Channel catfish and tilapia fed chopped soldier fly larvae or chopped larvae as a supplement replacing 25, 50, or 75% of commercial fish feeds during a ten-week test displayed no difference in fish weight gain or length as a result of the diets fed (Bondari and Sheppard, Aquaculture 24:103, 1981).

A need exists for a fish food that is acceptable and nutritional, particularly one which supports good growth and coloration at an acceptable feeding efficiency.

SUMMARY OF THE INVENTION

A fish food comprising preserved immature insects (e.g., insect larvae and pupae) is surprisingly effective in improving the growth, coloration, and feeding efficiency of fish, as compared to commercially available fish food. Such a food can be manufactured at acceptable cost, can be inexpensively stored for extended periods of time, and is easy to package and handle, thus providing the advantages of natural fish foods or food supplements with few of the drawbacks. Excellent results have been observed with a wide range of fresh, brackish, and salt water fish species including, but not limited to, carp such as koi and goldfish, trout, bass, catfish, salmon, and tropical fresh- or salt-water aquarium fish.

Therefore, it is an object of the present invention to provide a fish food comprising an amount of preserved immature insects, e.g., dried housefly or soldier fly larvae or pupae, effective to improve growth rate, coloration, or feeding efficiency of a fish. Preferably, the insects comprise at least about 5% of the diet of the fish by weight, preferably between about 5 and 50 weight percent, and most preferably between about 20 and 50 weight percent. Good results are observed even when the protein content of the fish food is 48 percent or greater.

In a preferred embodiment of the present invention, the fish food further comprises at least one member of the group consisting of Bioproducts Inc. "BioDiet BROOD," Star Milling Co. "40% Bass Food," and Star Milling Co. "Catfish Food," preferably a mixture comprising both "BioDiet BROOD" and "40% Bass Food," and most preferably comprising "BioDiet BROOD," "40% Bass Food," and "Catfish Food."

In another embodiment of the present invention, methods of feeding a fish are provided, the methods comprising feeding the fish a diet comprising an amount of preserved immature insects effective to improve the growth rate, coloration, or feeding efficiency of the fish.

DETAILED DESCRIPTION OF THE INVENTION

It has been discovered that a fish food comprising preserved immature insects, i.e., insect larvae or pupae or other immature forms (hereinafter abbreviated "LP"), is surprisingly effective in improving the growth rate and coloration of fish. Such a fish food also results in a higher feed efficiency: improved growth and coloration is observed even when the total food intake of the fish is substantially less than if the fish were to be fed a conventional commercially available fish food alone.

Fish fed a diet containing about 5 percent or more preserved LP exhibited a significantly higher growth rate and feeding efficiency than fish fed commercially available fish food lacking LP. This was surprising in view of the observation that channel catfish and tilapia fed chopped soldier fly larvae or chopped larvae as a supplement replacing 25, 50, or 75% of commercial fish feeds displayed no difference in fish weight gain or length as a result of the diets fed (Bondari and Sheppard, Aquaculture 24:103, 1981). In fact, there apparently have been no previous reports that a fish diet comprising preserved immature insects results in increased growth rates, improved coloration, or higher feeding efficiency.

Improvements in fish growth and coloration have been observed with feed comprising as little as about 5% LP by weight, preferably between about 5% to 50%, most preferably between about 5% to 20%. There appears to be little additional improvement in fish growth and coloration above 50% LP. In particular, as the percentage of LP approaches 100%, fish show little or no improvement in growth as compared with fish fed most commercial fish foods.

Commercial fish foods generally contain less than 48% protein, in part because it is thought that a food containing more protein causes ill effects in fish, including shorter life spans, sub-optimal growth, and susceptibility to fungus infections. However, fish have been observed to suffer no ill effects when fed a fish food according to the present invention, even when the total protein content of the food is higher than 48 percent.

Fish can be fed with the fish foods of the present invention in any manner and amount and according to any feeding schedule commonly employed in fish cultivation. However, it is preferred, particularly when feeding koi, that the amount of food presented to the fish be representative of an amount the fish, when hungry, will ingest in a five- to ten-minute period. Preferably, the fish are fed once per day, most preferably three to four times per week. It is preferred that any excess food be removed after the feeding period, e.g., by dipping it out. Alternatively, a fish such as catfish can be added to the fish population to consume any excess food.

It is preferable that fish be fed LP as a mixture with pre-formed fish food pellets, crumbles, or other fish food forms, e.g., commercially available fish foods, or as an ingredient in a fish food comprising other well-known ingredients included in commercial fish food formulations so as to provide a nutritionally balanced complete fish food., including, but not limited to: vegetable matter, e.g., flour, meal, starch or cracked grain produced from a crop vegetable such as wheat, alfalfa, corn, oats, potato, rice, and soybeans; cellulose in a form that may be obtained from wood pulp, grasses, plant leaves, and waste vegetable matter such as rice or soy bean hulls, or corn cobs; animal matter, e.g., fish and shellfish (e.g., shrimp or crab) meal, oil, protein or solubles and extracts, krill, meat meal, bone meal, feather meal, blood meal, or cracklings; algal matter; yeast; bacteria; vitamins, minerals, and amino acids; organic binders or adhesives; and chelating agents and preservatives. A wide variety of formulations are reported in both the patent and scientific literature. Alternatively, LP is used to supplement other foods, e.g., commercial fish foods, in the diet of the fish.

A wide variety of commercial fish foods may be used in combination with LP. It is preferred to use LP in combination with "BioDiet BROOD" pellets (Bioproducts, Inc., Warrenton, Oreg.) or "40% Bass Food (Star Milling Co., Perris, Calif.), more preferably with a mixture of "BioDiet BROOD" pellets and "40% Bass Food" and most preferably a mixture of "BioDiet BROOD" pellets, "40% Bass Food," and "Catfish Food" (Star Milling Co., Perris, Calif.). The addition of "Catfish Food" provides only a minor improvement in fish growth, feeding efficiency, and coloration.

The ingredients listed on the packaging for "BioDiet BROOD" are as follows: fish meal, krill (*Euphausia pacifica*), cooked hydrolyzed fish, blood meal, fish oil, lecithin, vitamin A acetate, vitamin D3 supplement, vitamin E (DL-α-tocopherol acetate), pantothenic acid, niacin, inositol, vitamin B2 (riboflavin), vitamin B6 (pyridoxine hydrochloride), thiamine mononitrate, folic acid, biotin, vitamin B12 supplement, processed grain byproducts, guar gum, propylene glycol, choline chloride, ascorbic acid (vitamin C), zinc sulfate, manganese sulfate, ethylene diamine dihydroiodide, and copper sulfate, potassium sotbate (a preservative), canthaxanthin, and ethoxyquin (a preservative).

The ingredients listed on the packaging for "40% Bass Food" are as follows: anchovy fish meal, ground wheat, soybean meal, wheat flour, meat and bone meal, fish oil, wheat bran, feather meal, dried distillers solubles and grains, soybean oil, vitamin C (AsPP L-ascorby-2-polyphosphate), propionic acid (a mold inhibitor), DL-methionine, choline chloride, vitamin A acetate, folic acid, vitamin D3, ethoxyquin (a preservative), niacin supplement, iron sulfate, manganous oxide, vitamin E acetate, DL-calcium pantothenic acid, zinc oxide, riboflavin supplement, thiamine mononitrate, pyridoxine hydrochloride, vitamin K (menadione sodium bisulfite complex), copper oxide, biotin, vitamin B12 supplement, and sodium selenite.

The ingredients listed on the packaging for "Catfish Food" are as follows: soybean meal, ground wheat, wheat bran with ground wheat screenings, anchovy fish meal, wheat flour, meat and bone meal, fish oil, blood meal (spray dried), vitamin C (AsPP L-ascorbyl-2-polyphosphate), limestone meal, soybean oil, salt, choline chloride, vitamin A acetate, propionic acid (mold inhibitor), vitamin D3, niacin supplement, zinc oxide, vitamin E acetate, DL-calcium pantothenic acid, manganous oxide, iron sulfate, riboflavin supplement, vitamin B12 supplement, thiamine mononitrate, vitamin K (menadione sodium bisulfite complex), pyridoxine hydrochloride, folic acid, copper sulfate, ethylene diamine dihydroiodide, ethoxyquin (a preservative), biotin, cobalt sulfate, and sodium selenite.

Any of various immature insects, e.g., insect larvae and/or pupae, are useful in fish food formulations according to the present invention, including, but not limited to, housefly (*Musca domestica*), soldier fly (family Stratiomyidae), Daphnia, or face fly (*Musca autumnalis*). The larvae and pupae are preferably "preserved" by means well known in the art, preferably by drying by methods such as air drying, freeze drying, or desiccating, e.g., with anhydrous propylene glycol (see, U.S. Pat. No. 4,537,785). Housefly or soldier fly larvae and pupae are preferred, as they are palatable to fish, produce good results, and are relatively inexpensive and readily available in commercial quantities. Dried housefly larvae and pupae are available, for example, from Cockerum Oregon Insects corporation, Tillamook, Oreg. and Gerald Green, Fly Pro, LLC, Garden City, Kans. Methods for the commercial production of soldier fly and housefly larvae, for example, have been described (see, inter alia, Newton et al., Proc. Georgia Nutrition Conference for the Feed Industry, November 17–19, 1992, pp. 132–139). The LP may be whole or ground, cracked, etc., although whole LP are preferred.

For feeding smaller fish species, such as many varieties kept in home aquariums, it may be necessary to provide a fish food having a correspondingly smaller size, as will be readily appreciated by the skilled artisan. For example, small tropical fish species can be fed fish food, derived from commercial fish food pellets with added LP, that has been passed through a blender (set on chop) to reduce the size of the food particles to an acceptable size.

DEFINITIONS

By "fish" is meant any member of the phylum Chordata, subphylum Vertebrata, and super-class Pisces. The present invention can be practiced with any of the considerable variety of fresh, brackish, or salt water fish species including, but not limited to: catfish, carp, trout, salmon, char, whitefish, sturgeon, tench, roach, pike, pike-perch, sole, turbot, yellowtail, bass, milkfish, tilapia, tilapia, gray mullet, eels and tropical fish (such as the fresh, brackish, and salt water tropical fish listed in Example 2, below). Yet other species with which the present invention can be practiced will be apparent to those skilled in the art.

A fish food comprising an "effective amount" of preserved immature insects is defined as a fish food comprising an amount of preserved immature insects that provides a significant improvement in either the growth rate, feeding efficiency, or coloration of a fish, as compared to the same food lacking the preserved immature insects. For example, a fish food supplemented with an effective amount of preserved immature insects can be compared with the same fish food lacking the supplement (as in Example 1 below, where the growth of fish fed "Base+LP" is compared to the growth of fish fed "Base" alone). Preferably the fish food provides a balanced diet and can be manufactured at acceptable cost, stored for extended periods of time without deterioration, and easily packaged and handled, such as a commercial fish food formulation supplemented with an effective amount of preserved immature insects.

A "significant" improvement in growth rate is defined as a statistically significant improvement in growth rate as measured by any reliable means employed by those of ordinary skill in the art for measuring the growth rate, e.g., the rate of gain in weight or length, of the particular fish variety, preferably an improvement of at least 5% or more, and most preferably at least 10–25% or more.

A "significant" improvement in feeding efficiency is defined as a statistically significant improvement in feeding efficiency as measured by any reliable means employed by those of ordinary skill in the art for measuring the feeding efficiency of the particular fish variety, preferably an improvement of at least 5% or more, and most preferably at least 10–25% or more. Feeding efficiency is a measure of the amount of a food required to provide a fish with sufficient food for normal growth and development.

A "significant" improvement in the coloration of a fish is defined as a visually detectable improvement in coloration, particularly external coloration, as determined by any of the means used by those of ordinary skill in the art. For example, each variety of koi has a well-accepted "standard" coloration characteristic of the variety, and koi are commonly judged on the basis of their coloration.

The invention will be better understood by reference to the following examples, which are intended to merely illustrate the best mode now known for practicing the invention. The scope of the invention is not to be considered limited thereto, however.

EXAMPLES

Example 1

Improved Growth and Coloration of Kohaku Koi Fed Food Containing, Insect Larvae and Pupae The coloration of cultivated fish, such as goldfish or koi, that are fed processed or prepared foods is often drab. Kohaku koi, for example, are prized for their vibrant vermillion red and white coloration. When fed commercially available koi food, however, they often suffer a loss or dilution of color, with their optimal white color becoming yellowish and their optimal red color becoming orange.

In a number of separate tests, a large variety of koi fed the fish foods of the present invention have displayed an increased growth rate and improved coloration as compared to koi fed commercially available fish foods. Varieties of koi tested, include Shusui (black and white), Asagi (black and white), Bekko (black and white), Hariwake (white and yellow), Platinum or Metallic (white), Kohaku (red and white), Showa (black with red and white), and Hewaki (white and yellow). (For an explanation of the characteristics of koi varieties, see, e.g., Kuroki and Iwago, The Japanese Colored Carp: Nishiki-Goi, trans. Axelrod, Kodansha Ltd., Tokyo, Japan, 1973, and Kuroki and Iwago, Encyclopedia of Nishiki-Goi, trans. Axelrod, Kodansha Ltd., Tokyo, Japan, 1971.) In all cases, the koi recovered vibrant, true coloration or displayed improved ability to "hold" optimal color.

The following is a representative experiment showing the dramatic improvements in growth rate, feeding efficiency, and coloration in koi fed the fish foods of the present invention.

Two 8"Kohaku koi from the same shipment were raised at approximately 55° F. in each of six square concrete vats, each filled with 87 gallons of well water filtered through an under-gravel biological filter. The vats were cleaned weekly. Koi in each tank were fed a different food:

| Tank 1: | Tetra Pond "Floating Koi Sticks" (Tetra Werke, Dr. rev. nat. Ulrich Baensch GmbH, D-4520 Melle 1, Germany) |
|---|---|
| Tank 2: | Wardley Corporation "Hem 650" (Secaucus, New Jersey) |
| Tank 3: | Argent Chemical Laboratories "Royal Garden Koi Feed" (Redmond, Washington) |
| Tank 4: | Hikari "Staple," "Economy," "Wheat Germ," "Gold," "Spirulina," "Plankton," "Hi-Growth," "Excel," "Oranda Gold," "Cichlid Staple," "Cichlid Excel," "Cichlid Bio-Gold," "Lionhead" (Kamihata Fish Ind. Ltd., Chiba City, Japan, imported by Hikari Sales U.S.A., Hayward, CA) |
| Tank 5: | "Base": Mixture containing approximately 200 lb. "BioDiet BROOD Pellets," (100 lb. each small pellets and large pellets; Bioproducts, Inc., Warrenton, OR), 400 lb. "40% Bass Food" (Star Milling Co., Perris, CA), 400 lb. "Catfish Food" (Star Milling Co., Perris, CA), and 25 lb. dried *Euphausia pacifica* (krill) (Argent Chemical Laboratories, Redmond, Washington). |
| Tank 6: | "Base + LP": Mixture containing approximately 50 lb. whole housefly (*Musca domestica*) larvae, 50 lb. whole housefly pupae (Cockerum Oregon Insects Corporation, Tillamook, OR or Gerald Green, Fly Pro, L.L.C., Garden City, KS), 75 lb. whole soldier fly larvae (G.L. Newton, Coastal Plain Experiment Station, University of Georgia, Tifton, GA.), 25 lb. dried *Euphausia pacifica* (krill) (Argent Chemical Laboratories, Redmond, Washington), 100 lb. BioDiet BROOD small pellets, 100 lb. BioDiet BROOD large pellets, 400 lb. 40% Bass Food, and 400 lb. Catfish Food. |

The fish were fed as much as they would eat in five to ten minutes once daily, with any excess removed by dipping out. After 2.5 months, the fish were measured. Koi in tanks 1 to 5 all grew approximately 1" to approximately 9" long. By contrast, koi in tank 6, which were fed Base+LP, grew approximately 5" thus reaching 13" long. Moreover their red coloration improved significantly during the test period from an orange-red to a true vermilion red and their white coloration improved from a yellowish-white to a true white. It should be noted that improved growth and color were observed even though koi fed Base+LP ate approximately 30% less food than the other fish.

EXAMPLE 2

Improved Growth and Coloration of Other Commercially Cultivated Fish Species Fed Food Containing Insect Larvae and Pupae Improved growth rates and coloration have been observed among a variety of commercially cultivated fish fed "Base+ LP" (as described in Example 1 above), including: goldfish; trout; bass; and catfish, including blue channel and golden catfish. In addition, similar improvements in growth and coloration have been observed among a variety of smaller cultivated varieties commonly used as aquarium fish, including fresh, brackish, and salt water tropical fish. Fresh water tropical fish varieties tested include angel fish, barb, catfish, cichlids, corydoras, danio, discus, eel, gourami, guppy, loach, minnow, molly, platy, Plecostumas, rainbow and platy variatus, rasbora, shark, sword, tetra, botia, knife fish, and lionfish. Brackish water varieties include brackish-archer fish, flounder, golby, half beak, mono, needle fish, pipe fish, puffer, scat (green and red), and bumble bee. Salt water varieties include twin spot damsel, yellowtail damsel, barbed squirrel, wrasse, black-spotted puffer, trigger fish, puffer, and butterfly fish. Small fish species were fed fish food that had been passed through a blender (set on chop) to reduce the size of the food particles to an acceptable size.

All publications and published patent documents cited in this specification are incorporated herein by reference to the same extent as if each individual publication or patent application was specifically and individually indicated to be incorporated by reference.

This invention has been detailed both by example and by direct description. It should be apparent that one having ordinary skill in this art would be able to surmise equivalents to the invention as described in the claims which follow but which would be within the spirit of the description above. Those equivalents are to be included within the scope of this invention.

What is claimed is:

1. A method of improving the coloration of a koi comprising feeding the koi a diet comprising: preserved immature insects, fish meal, krill, cooked hydrolyzed fish, blood meal, fish oil, lecithin, vitamin A, vitamin D3, vitamin E, pantothenic acid, niacin, inosicol, vitamin B2, vitamin B6, thiamine, folic acid, biotin, vitamin B12, processed grain byproducts, guar gum, propylene glycol, choline chloride, vitamin C, zinc sulfate, manganese sulfate, ethylene diamine dihydroiodide, copper sulfate, potassium sotbate, canthaxanthin, and ethoxyquin, wherein the preserved immature insects (i) comprise at least one member of the group consisting of houseflies and soldier flies, and (ii) comprise between about 5 and 50 percent of the diet of the koi.

2. The method of claim 1 wherein the diet further comprises ground wheat, soybean meal, wheat flour, meat and bone meal, wheat bran, feather meal, dried distillers solubles and grains, soybean oil, propionic acid, methionine, iron sulfate, manganese oxide, zinc oxide, riboflavin, pyridoxine hydrochloride, vitamin K, copper oxide, and sodium selenite.

3. The method of claim 2 wherein the diet further comprises limestone meal, sodium chloride, and cobalt sulfate.

4. The method of claim 1 wherein the diet has a protein content of at least 48 percent.

5. The method of claim 1 wherein the diet comprises greater than 10 percent by weight and less than 50 percent by weight of the preserved immature insects.

6. The method of claim 1 wherein the preserved immature insects comprise between about 5 and 20 percent by weight, inclusive, of the diet of the fish.

7. The method of claim 1 wherein the preserved immature insects comprise houseflies.

8. The method of claim 1 wherein the preserved immature insects are dried.

\* \* \* \* \*